US008457872B2

(12) United States Patent
Deker

(10) Patent No.: US 8,457,872 B2
(45) Date of Patent: Jun. 4, 2013

(54) METHOD FOR MANAGING THE FLIGHT OF AN AIRCRAFT

(75) Inventor: Guy Deker, Cugnaux (FR)

(73) Assignee: Thales, Neuilly Sur Seine (FR)

( * ) Notice: Subject to any disclaimer, the term of this patent is extended or adjusted under 35 U.S.C. 154(b) by 616 days.

(21) Appl. No.: 12/710,483

(22) Filed: Feb. 23, 2010

(65) Prior Publication Data

US 2010/0217510 A1 Aug. 26, 2010

(30) Foreign Application Priority Data

Feb. 24, 2009 (FR) ..................................... 09 00832

(51) Int. Cl.

| | |
|---|---|
| ***G06F 19/00*** | (2006.01) |
| ***G06F 17/10*** | (2006.01) |
| ***G01C 23/00*** | (2006.01) |
| ***G01C 21/00*** | (2006.01) |
| ***G05D 1/00*** | (2006.01) |
| ***G05D 1/02*** | (2006.01) |
| ***G05D 1/08*** | (2006.01) |
| ***F42B 10/00*** | (2006.01) |
| ***B64C 3/18*** | (2006.01) |
| ***B64C 13/18*** | (2006.01) |
| ***B64C 3/54*** | (2006.01) |
| ***G01S 13/08*** | (2006.01) |
| ***G01S 19/01*** | (2010.01) |
| ***G01S 19/03*** | (2010.01) |
| ***G01S 3/02*** | (2006.01) |

(52) U.S. Cl.

USPC .......... 701/120; 701/3; 701/4; 701/7; 701/16; 701/121; 701/122; 701/300; 701/301; 244/3.15; 244/76 R; 244/175; 244/182; 244/218; 340/971; 340/972; 340/973; 342/118; 342/123; 342/357.39; 342/357.4; 342/455

(58) Field of Classification Search

USPC ............... 701/3, 4, 7–16, 120–122, 300, 301; 244/3.15, 76 R, 175–182, 218; 340/971–973; 342/118, 123, 357.39, 357.4, 450–455

See application file for complete search history.

(56) References Cited

U.S. PATENT DOCUMENTS

| | | | | |
|---|---|---|---|---|
| 4,774,670 | A | 9/1988 | Palmieri | |
| 5,051,910 | A | 9/1991 | Liden | |
| 6,061,612 | A * | 5/2000 | Sainthuile et al. | 701/7 |
| 6,181,987 | B1 | 1/2001 | Deker et al. | |
| 6,587,757 | B2 * | 7/2003 | Sainthuile | 701/1 |
| 6,789,011 | B2 * | 9/2004 | Baiada et al. | 701/120 |

(Continued)

FOREIGN PATENT DOCUMENTS

WO 01/57828 A1 8/2001

*Primary Examiner* — Mary Cheung
*Assistant Examiner* — Majdi Alsomiri
(74) *Attorney, Agent, or Firm* — Baker & Hostetler, LLP

(57) ABSTRACT

The invention relates to a method for managing the flight of an aircraft flying along a trajectory and being subject to an absolute time constraint (on a downstream point) or relative time constraint (spacing with respect to a downstream aircraft), the said aircraft comprising a flight management system calculating a temporal discrepancy to the said time constraint, wherein the said method includes the following steps: the calculation of a distance on the basis of the temporal discrepancy, the modification of the trajectory: if the temporal discrepancy to the time constraint corresponds to an advance, the lengthening of the trajectory by the distance; if the temporal discrepancy to the time constraint corresponds to a delay, the shortening of the trajectory by the distance.

8 Claims, 6 Drawing Sheets

U.S. PATENT DOCUMENTS

| | | | | |
|---|---|---|---|---|
| 6,912,461 | B2 * | 6/2005 | Poreda | 701/120 |
| 7,412,324 | B1 | 8/2008 | Bagge et al. | |
| 7,433,779 | B2 | 10/2008 | Deker et al. | |
| 7,584,046 | B2 | 9/2009 | Deker | |
| 2007/0225876 | A1 | 9/2007 | Caillaud et al. | |
| 2008/0119971 | A1 | 5/2008 | Deker et al. | |
| 2008/0161982 | A1 | 7/2008 | Coulmeau | |
| 2008/0195264 | A1 | 8/2008 | Deker et al. | |
| 2008/0228333 | A1 * | 9/2008 | De Menorval et al. | 701/14 |
| 2008/0243319 | A1 | 10/2008 | Coulmeau et al. | |
| 2008/0300738 | A1 | 12/2008 | Coulmeau et al. | |
| 2008/0312779 | A1 * | 12/2008 | Sacle et al. | 701/7 |
| 2009/0043434 | A1 | 2/2009 | Deker | |
| 2009/0130982 | A1 | 5/2009 | Coulmeau et al. | |
| 2009/0259351 | A1 * | 10/2009 | Wachenheim et al. | 701/7 |
| 2009/0259392 | A1 * | 10/2009 | Berard et al. | 701/121 |
| 2010/0017113 | A1 * | 1/2010 | Artini | 701/202 |

* cited by examiner

METHOD FOR MANAGING THE FLIGHT OF AN AIRCRAFT

CROSS-REFERENCE TO RELATED APPLICATIONS

This application claims priority to foreign French patent application No. FR 09 00832, filed on Feb. 24, 2009, the disclosure of which is hereby incorporated by reference in its entirety.

FIELD OF THE INVENTION

The invention relates to the flight management of an aircraft and more particularly to compliance with time constraints and/or relative spacing constraints.

BACKGROUND OF THE INVENTION

The growth in air traffic density is compelling an increase in arrival rates. This involves the instigation of time constraints and maximum reduction in inter-aircraft separations which then become very tricky to maintain when the speeds are low, as in the final approach to a landing runway, and if the wind context changes. The bottleneck for air traffic is essentially during the approach phase because of the frequent uniqueness of the runway in service and of its associated approach, and of the obligatory maintaining of a safety separation distance between aircraft in the final approach so as to reduce the risks of collision or stalling related to wake turbulence or to unforeseen manoeuvres such as go-arounds. Today, this separation is essentially managed through the speed which is maintained at least equal between two successive aircraft. The flow of aircraft on landing is thus maximized by maintaining this minimum distance.

It may happen, however, that an approach procedure necessitates a large turn (minimum)120° as in turnaround procedures or traditional manoeuvres with a tailwind section ("circle to land"). Except, if a relatively strong wind exists, a major problem can occur when two aeroplanes following one another at the same speed are temporarily brought closer together on account of the wind. FIG. 1 represents an example of such a case. A first aircraft $A_1$ flying along a trajectory 100 trails a second aircraft $A_2$ flying along the same trajectory 100. The trajectory comprises an arrival segment 101, a turn 102 and a final segment 103 terminating at a landing runway 104. The arrival segment 101 and the final segment 103 are parallel. The first aircraft A1 is positioned at the end of the arrival segment 101. The second aircraft A2 is positioned at the start of the final segment 103. When the second aircraft A2 is situated on the final segment 103, it experiences a headwind Ve which slows it down, while the first aircraft A1 being situated on the arrival segment 101 is accelerated by a tailwind Ve. For a time equal to the initial separation time Tsep1 (typically 90 seconds or more), the separation is no longer maintained. The separation time Tsep2 is then less than the initial separation time Tsep1. This forces the first aeroplane A1 to reduce its air speed at the risk of attaining a minimum safety speed (stall protection) below which the aeroplane must not descend. Moreover, the inertia of the engines limits the effectiveness and reactivity in the case of wind and requires increased separations.

SUMMARY OF THE INVENTION

The invention is aimed at alleviating notably the problem cited above by proposing a method for managing the flight of a first aircraft A1 flying along a trajectory and being subject to a temporal constraint defined by a date determined with respect to a fixed point i.e. by a temporal separation with respect to a second aeroplane A2, the said first aircraft A1 flying according to a constant air speed $V_{a1}$ with an initial wind Ve, the said method being characterized in that it comprises the following steps:

- the calculation of a distance ΔD on the basis of the initial wind Ve and of the air speed $V_{a1}$,
- the modification of the trajectory: if the distance ΔD is positive, the lengthening of the trajectory by a distance equal to the distance ΔD; if the distance ΔD is negative, the shortening of the trajectory by a distance equal to the opposite of the distance ΔD, the trajectory being situated in an air route and comprising flight segments and at least one transition between the said flight segments, the modification of the trajectory making it possible to satisfy the temporal constraint without modifying the air speed of the first aircraft A1, the modification of the trajectory comprising the following steps:
  - the choosing of a transition of the trajectory,
  - the calculation of a roll directive ($PhiNom_2$) for the said transition on the basis of the temporal discrepancy (ΔT),
  - the calculation of the radius of curvature ($R_2$) of the trajectory in the said transition on the basis of the roll directive ($PhiNom_2$),
  - if the radius of curvature ($R_2$) is less than the minimum radius ($R_{2lim}$) making it possible to remain in the air route, the roll directive ($PhiNom_2$) is applied to the aircraft (77),
  - otherwise:
- the calculation of a maximum time discrepancy ($\Delta T_{max}$) in the said transition and of a corresponding roll directive,
- the calculation of a remaining time discrepancy ($\Delta T_{remaining}$): $\Delta T_{remaining}=\Delta T-\Delta T_{max}$
- the iteration of the step of choosing a transition with the remaining temporal discrepancy ($\Delta T_{remaining}$) until there is no longer any transition, not yet selected.

According to a variant of the method according to the invention, the trajectory (200) comprising an arrival segment (201) and a final segment (202) that are parallel, the modification of the trajectory (200) is by half the distance ($D_{sep}$) calculated on the arrival segment (201) and by half the distance ($D_{sep}$) calculated on the final segment (202).

According to a variant of the method according to the invention, the trajectory (300) comprising an arrival segment (301) and a final segment (302) forming an angle α, the modified trajectory comprises a lengthening segment (307) situated straight ahead of the final segment (303), a modified turn (305) linked to the lengthening segment (307) and capture segment (306) linking the trajectory of the aircraft to the modified turn (305).

According to another variant of the method according to the invention, the said point of the temporal constraint being a point, the temporal constraint being expressed in the form of a determined date at the said fixed point (503), the said first aircraft (A1) comprising a flight management system calculating a remaining flight time ($T_{remaining}$) so that the aircraft arrives at the given point by flying at the air speed ($V_{a1}$) and with the initial wind (Ve), the method furthermore comprises a step of measuring a wind discrepancy (ΔVe) with the initial wind (Ve), and in that the calculation of the distance (ΔD) follows the following relation:

$$\Delta D=\Delta Ve\cdot[T_{remaining}-K],$$

K being a factor related to the turn time.

According to a variant of the method according to the invention, the modification of the trajectory (500) is by half the distance ($\Delta D$) calculated on the arrival segment (501) and by half the distance ($\Delta D$) calculated on the final segment (502).

According to a variant of the method according to the invention, the trajectory comprises a final segment and an arrival segment forming an angle $\alpha$, the modification of the trajectory consisting of an extension (507) of length equal to half the distance ($\Delta D$), of a new turn (505) and of a capture (506) of the new turn (505).

The method according to the invention permanently maintains the safety separation distance with respect to the preceding aeroplane and/or ensures compliance with the next downstream time constraint. This aim is attained by altering the horizontal trajectory of the aircraft and therefore by temporarily lengthening or reducing the said trajectory. The method according to the invention has the advantage of not modifying the speed of the aircraft whose variation is limited by a flight envelope, variation of the speed of an aircraft not being recommended in the approach so as not to destabilize it during the landing.

By not modifying the speed of the aircraft, the invention makes it possible to guarantee a secure landing with no risk of stalling or of go-around arising out of an uncontrolled speed. Through its maintaining of the advised approach and landing speed, the invention has furthermore the advantage of not increasing the landing distance and therefore of optimizing the runway occupancy time under the conditions of the day.

The invention makes it possible to take into account a variation in wind projected on the aeroplane which is a source of delay or advance with respect to a temporal constraint. This problem is solved through an adjustment of flight distance at unchanged speed. Indeed, in the approach, the speed variation is limited. By contrast in the state of the art, regulation is achieved by changing speed and generally while cruising.

The invention will be better understood and other advantages will become apparent on reading the detailed description given by way of nonlimiting example and with the aid of the figures among which:

DETAILED DESCRIPTION

Figure 1:
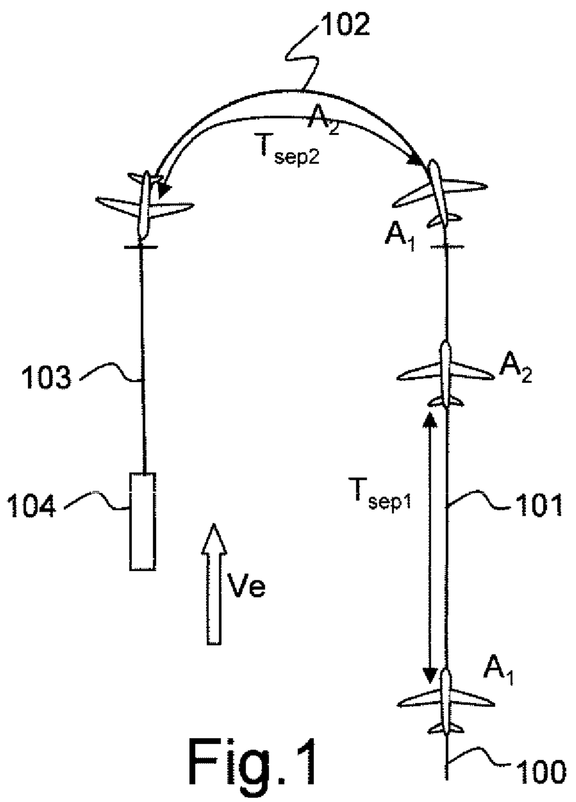
FIG. 1, already presented, represents two aircraft along an approach trajectory.
Figure 2:
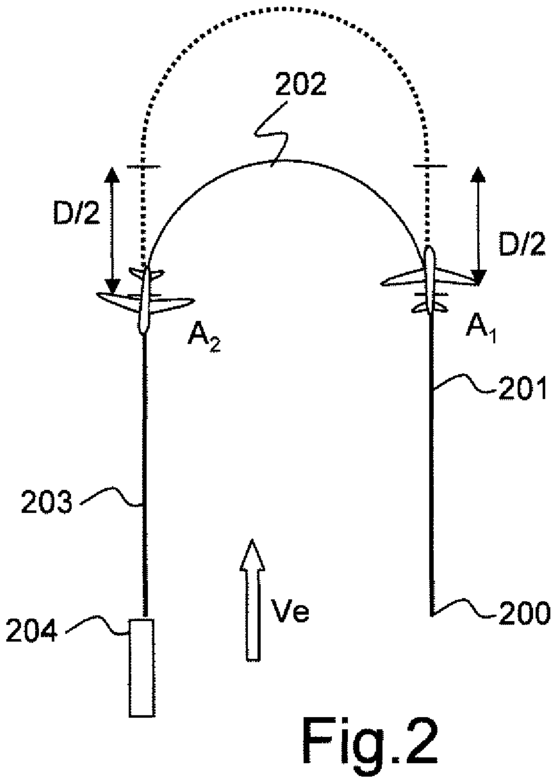
FIG. 2 represents a first exemplary implementation of the method according to the invention.

FIG. 2 represents a first exemplary implementation of the method according to the invention. A first aircraft $A_1$ flying along a trajectory 200 trails a second aircraft $A_2$ flying along the same trajectory 200. The trajectory comprises an arrival segment 201, a turn 202 and a final segment 203 terminating at a landing runway 204. The arrival segment 201 and the final segment 203 are parallel. The first aircraft A1 is positioned at the end of the arrival segment 201. The second aircraft A2 is positioned at the start of the final segment 203. The two aircraft are subjected to a wind Ve: tailwind for the first aircraft A1 and headwind for the second A2. As in the example of FIG. 1, the separation is no longer maintained for a time equal to the initial separation time. This is a conventional case where two aircraft are following one another during an approach procedure necessitating a turn to take up alignment with the axis of the runway with a considerable wind. The obligation to put down on the runway axis maximizing the headwind implies that before the last turn, the aircraft have the wind in their tail. The first aircraft $A_1$ flies at a first air speed $V_1$ and the second flies at a second air speed $V_2$.

At the moment when the second aircraft $A_2$ is making a large turn (typically to align itself with the final approach), the wind becomes against it while during the moment of the turn, the first aircraft $A_1$ which is following is still pushed by the wind Ve, so bringing it closer to the second aircraft $A_2$. This period during which the aeroplanes get dangerously close to one another is related to the turn time which can be of the order of 60 seconds (time for a 180-degree turn at the mean rate of 3 degrees per second). Knowing that the spacing is generally 90 seconds, there will be at least 30 seconds during which the two aircraft will get closer to one another. If it is considered that the two aircraft have an identical air speed $V_a$, the second aircraft $A_2$ flies at a ground speed of $V_a$−Ve and the first aircraft A1 at a ground speed $V_a$+Ve.

In this example, a first step of the method according to the invention is the acquisition, by the first aircraft A1, of the position of the second aircraft A2 and the measurement of the distance separating them. This is performed by reception of the data from the second aircraft (whose identification can be established and confirmed by the controller or the pilot if possible) which is emitted by a communication system making it possible to disseminate the position thereof in broadcast mode (ADS-B OUT), by the first aircraft A1 equipped with a reception system making it possible to receive the information broadcast by surrounding aircraft (ADS function-B IN). The acquired data are, for example, the following: a message time (Time stamp) indicating the time of transmission of the data, the flight identifier (Flight ID), a route followed by the aircraft (Track), the current position of the aircraft (latitude and longitude), the ground speed and the wind speed measured by the aircraft.

On the basis of the data received from the second aircraft $A_2$, the system according to the invention calculates the ground distance between the two aircraft taking account of the known geometry of the approach (the trajectory 200 on the ground being assumed to be common to the two aircraft). The distance which separates the two aircraft is therefore the difference between the distance separating the first aircraft $A_1$ from the runway threshold 204 and the distance separating the second aircraft $A_2$ from the runway threshold 204, distance calculated along the trajectory.

The following step of the method according to the invention consists in modifying the trajectory so as to maintain the separation. The ground speed of the second aircraft A2 is $V_{a2}$−Ve while that of the first aircraft 1 is $V_{a1}$+Ve.

According to a first variant of the method according to the invention, since generally the speeds of the aircraft in sequence are globally identical, the approximation is made that the two aircraft are flying at an identical speed $V_a$. The ground speed relative discrepancy is therefore twice the wind speed Ve when closing in on one another. To avoid closing in on one another, it will be necessary to lengthen the trajectory of the trailing aeroplane by a conservative value equal to the difference in ground speed between the two aircraft, as traversed in the time remaining until the first aircraft A1 enters the turn. Since the aircraft are separated with a minimum of 90 seconds and since at the standard rate a turn of 180 degrees lasts 60 seconds (3 degrees per second), then during the first 60 seconds, the second aircraft A2 sees its ground speed decrease from $V_{a2}$+Ve (when it has the wind in its tail) to $V_{at}$−Ve (when it is heading into the wind) while the first aircraft A1 remains at the ground speed $V_{ai}$+Ve. For the next 30 seconds, the speed discrepancy is constant 2Ve. For the next 60 seconds, it is the ground speed of the first aircraft A1 which reduces to $V_{a1}$−Ve.

The first aircraft A1 closes in on the second A2 by a distance D proportional to the effective wind and to the separation time between the two aircraft:

$$D=2\times T\text{sep(hr)}\times Ve(\text{kt})=T\text{sep(sec)}\times Ve(\text{kt})/1800$$

Where Tsep(hr) is the separation time between the two aircraft expressed in hours and Tsep (sec) the separation time between the two aircraft expressed in seconds and Ve (kt) the wind expressed in knots.

According to a second, more accurate, variant of the method according to the invention, the theoretical calculation is used which shows that the variation in relative distance D between the two aircraft is the integral along the trajectory of the difference in the ground speeds $V_{s1}$, $V_{s2}$ between the two aircraft, i.e. $V_{S1}-V_{s2}=(V_{a1}+V_{e1})-(V_{a2}+V_{e2})V_{e1}-V_{e2}$ with the assumption that the aircraft have the same air speed $V_{a1}=V_{a2}=V_e$. Cos α1−$V_e$. Cos α2 after projections of the wind vector onto the aircraft vectors, thereby giving:

$$D = Ve(kt)\times\int_{Tstarttum}^{Tendtum}(\text{Cos}\alpha 1-\text{Cos}\alpha 2)\cdot dt$$

with α1 the angle between the speed vector $V_{a1}$ and the wind vector $\vec{V}_W$ with norm Ve, α2 the angle between the speed vector $V_{a2}$ and the wind vector $\vec{V}_W$ and D the distance between the two aircraft in nautical miles (Nm) Ve (kt) the wind expressed in knots.

The angles Ang1 and Ang2 respectively of the aircraft A1 and A2 with respect to the separation section (aircraft instantaneous heading−heading of the separation section), which aircraft headings varying according to the standard rate ω of 3°/sec at moments staggered over time (from the start-of-turn time of the first aircraft—here arbitrarily 0 seconds—until the end-of-turn time of the second aircraft—here 180 seconds—and considering a spacing of the two aircraft of 90 seconds) according to the following table:

| T (sec) | 0 | 60 | 90 | 150 | 180 |
|---|---|---|---|---|---|
| Ang1 | 0 ωt 180 | 180 | 180 | 180 | 180 |
| Ang2 | 0 | 0 | ω(t − 90) | 180 | 180 |

The angles Ang1 and Ang2 are used to describe the evolution over time of the aircraft headings referred to the separation heading, also called heading of the tailwind section. The so-called tailwind section is the reverse route to landing, performed for various historical reasons (to evaluate the wind, to reduce speed, to deploy the landing configuration, to check the landing conditions, etc.).

To avoid closing in on one another, it is therefore necessary to lengthen the separation section of the trajectory of the first aircraft by D/2.

For example, in the case of a wind on arrival of 30 kts and a separation time of 90 seconds, the trailing aircraft will close up by 1.5 Nm which will be compensated for by adding 0.75 Nm to the separation section of the trajectory of the trailing aircraft.

In another variant of the method according to the invention, the approximation consisting in considering the first speed V1 to be equal to the second speed V2 is dropped. Accordingly, the speed discrepancy $\Delta V=V_{s1}-V_{s2}=(V_{a1}+V_{e1})-(V_{a2}+V_{e2})=V_{a1}-V_{a2}+V_{wind}$. (Cos α1−Cos α2) is integrated over the time remaining up to the runway for the calculation of the distance D.

Figure 3:
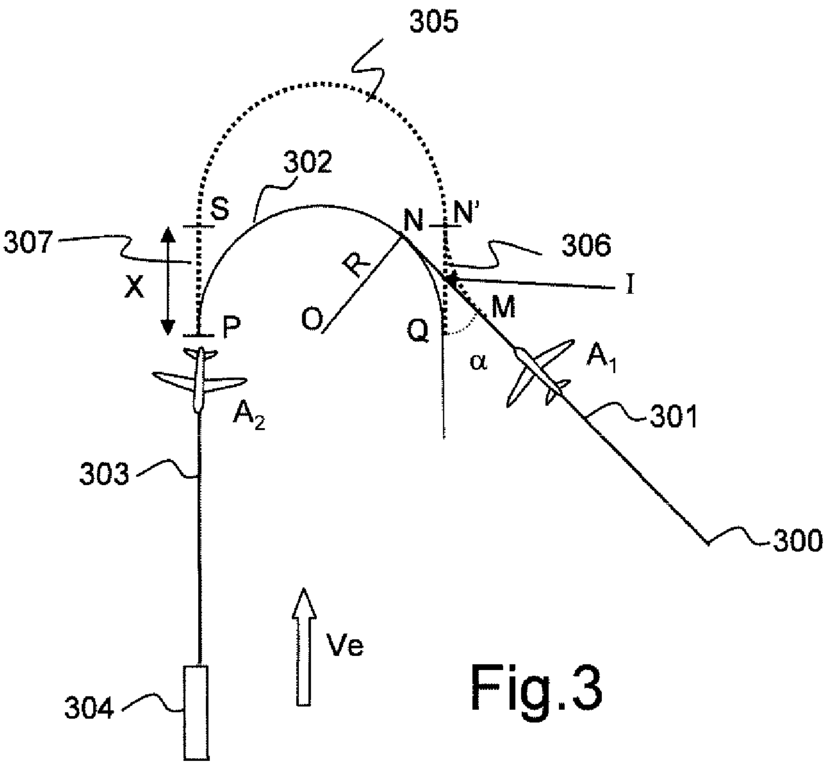
FIG. 3 represents a second exemplary implementation of the method according to the invention.

FIG. 3 represents a second exemplary implementation of the method according to the invention. A first aircraft $A_1$ flying along a trajectory 300 trails a second aircraft $A_2$ flying along the same trajectory 300. The trajectory comprises an arrival segment 301, a turn 302 and a final segment 303 terminating at a landing runway 304. The first aircraft $A_1$ is positioned at the end of the arrival segment 301. The second aircraft $A_2$ is positioned at the start of the final segment 303. The two aircraft are subjected to a wind Ve: sidewind for the first aircraft $A_1$ and headwind for the second A2. The arrival segment 301 and the final segment 303 form an angle α and are linked by a turn 302 of radius R.

The step of acquisition, by the first aircraft A1, of the position of the second aircraft A2 and of measuring the distance separating them is identical to the previous example. The calculation step is a generalization of the calculation of the previous example. The first aircraft A1 closes in on the second A2 by a distance D calculated as in the above example (the variation in relative distance related to the wind taking place only in the runway alignment turn which is substantially the same).

The modification of the trajectory of the first aircraft $A_1$ then consists in performing a capture 306 of an alignment turn 305 of radius R prolonged by a segment 307 with a distance X meeting up with the final segment 303 as in the diagram of FIG. 3. This capture will emanate from an interception point I which lies at the distance 2R·tan(α/2) before the end of the arrival segment 301. The distance X is deduced from the difference (equal to D) between the extended trajectory defined by the segments MN', N'S and SP of respective length Rα, πR and X) and the initial trajectory defined by the segments MN and NP of respective length 2R·tan(α/2) and R[π−α]. We therefore have X=D−2R[tan(α/2)−α].

According to a variant of the method according to the invention, adjusting a trajectory of an aircraft also makes it possible to comply with a time constraint imposed on the said aircraft. Adjusting the trajectory without modifying the speed when there is little speed margin for example, makes it possible to continue to satisfy the time constraint. The adjustment is done: either by effecting a trajectory extension before arriving at a point with obligatory overflight (for example a destination time constraint), or by modulating turn transitions for so-called fly-by transitions (transition without obligatory overflight of the turning point), or by combining the above two schemes if the trajectory adjustment is limited by the width of the aerial procedure or route with horizontal navigation precision requirement (such as RNP Required Navigation Performance).

Figure 4:
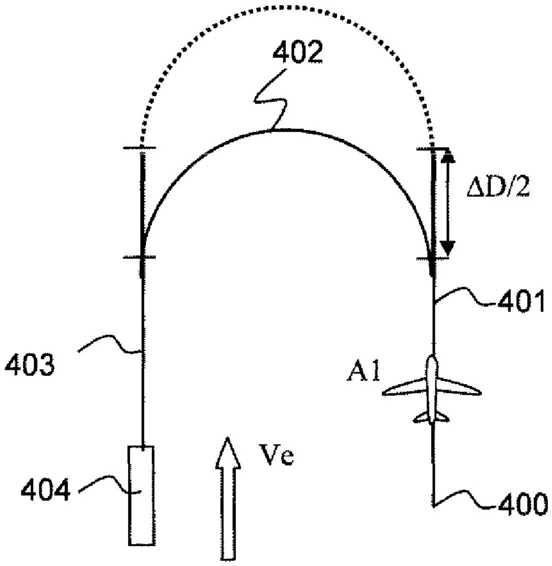
FIG. 4 represents a third exemplary implementation of the method according to the invention.

FIG. 4 represents a third exemplary implementation of the method according to the invention. An aircraft A1 flies along a trajectory 400. The trajectory comprises an arrival segment 401, a turn 402 and a final segment 403 terminating at a landing runway 404. The arrival segment 401 and the final segment 403 are parallel. The aircraft A1 is positioned on the arrival segment 401 and is subjected to a tailwind Ve. A time constraint (RTA) is entered on a waypoint downstream of the aircraft with "overfly" overflight constraint. The constrained waypoint is in this example the threshold of the landing runway. It is assumed that the estimated time of arrival at the constrained waypoint 404 is in advance of the temporal constraint, making it necessary to lengthen the time, and therefore in the method according to the invention at unchanged speed to lengthen the trajectory.

At a given initial instant $T_0$, the distance along the initial trajectory 400 between the aircraft and the point of the time constraint 404 equals D. It is calculated by integrating the variation of the ground speed over the time remaining up to the constraint:

$$D=\int_{T0}^{Tdestination} Vs\cdot dt=\int_{T0}^{Tdestination}[Va+Ve.\text{Cos}\alpha]\cdot dt$$

with α the angle between the wind and the aircraft vector, Ve the effective wind component, Vs and Va the ground and air speeds of the aircraft $A_1$ and $T_{destination}$ the time of arrival at the point of the time constraint.

During the turn, the wind component vanishes, thus leaving:

$$D=Va\cdot[T\text{destination}-T0]+Ve\cdot[T\text{start turn}-T0]+Ve\cdot[T\text{destination}-T\text{end turn}]=[Va+Ve]\cdot\Delta T+Ve[T\text{start turn}-T\text{end turn}].$$

Where $T_0$ is the initial instant at which the calculation starts, when the aircraft has not yet made its turn. $T_{destination}$ is in fact the time constraint (RTA for Required Time of Arrival) which moreover is not necessarily at destination but very close and in any event after the last turn. $T_{start\ turn}$ and $T_{end\ turn}$ are the respective times at which the aircraft turn begins and finishes.

If a wind component Ve is added to this ground speed Vs, compliance with the time constraint will then necessitate either modifying the air speed (which may be problematic in the approach because of the reduced speed envelope), or modifying the distance.

The next step of the method according to the invention consists in calculating a modification of trajectory remaining as operational as possible and inducing a distance discrepancy ΔD. The distance discrepancy ΔD follows the following relation:

If the wind alters and becomes Ve+ΔVe, a trajectory lengthening or reduction ΔD will be required. The modification of the trajectory ΔD follows the following relation:

$$\Delta D=[(Va+Ve+\Delta Ve)\cdot T_{remaining}-(Ve+\Delta Ve)\cdot 60\text{ sec}]-[(Va+Ve)\cdot T_{remaining}-Ve\cdot 60\text{ sec}]=\Delta Ve\cdot[T_{remaining}-K],$$

With $T_{remaining}$ being the time taken to perform the distance D and K being a turn time factor taking account of the time required to carry out the turn which is for example 60 seconds at the standard turn rate. $T_{remaining}$ is the discrepancy between the time constraint RTA and the initial time T0. D is the distance traveled with the wind Ve. D+ΔD is the distance traveled with the wind Ve+ΔVe. ΔD is therefore the distance discrepancy required in order to adhere to the time constraint RTA at constant air speed Va if the wind alters by ΔVe.

If there is an increase in the tailwind component (or a decrease in the headwind component), the length of the arrival segment 401 and that of the final segment 404 are increased by half the distance discrepancy ΔD.

If there is a decrease in the tailwind component (or an increase in the headwind component), the length of the arrival segment 401 and that of the final segment 404 are decreased by half the distance discrepancy ΔD.

This is possible only if the aircraft is not yet in the last turn. If the aircraft is already in the last turn, the requirement of minimum separation between traffic on approach implies that it is impossible to overstep the axis and therefore it is not possible to modify the trajectory.

Figure 5:
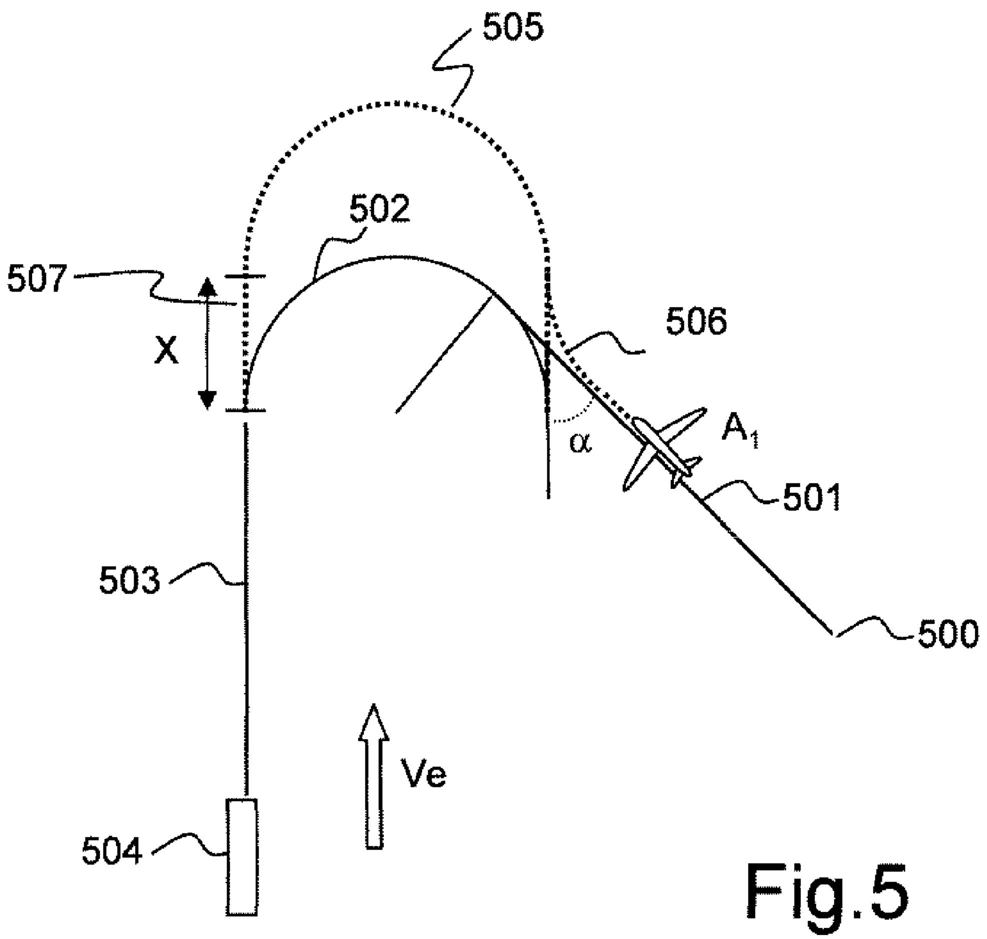
FIG. 5 represents a fourth exemplary implementation of the method according to the invention.

FIG. 5 represents a fourth exemplary implementation of the method according to the invention. An aircraft $A_1$ flies along a trajectory 500. The trajectory 500 comprises an arrival segment 501, a turn 502 and a final segment 503 terminating at a landing runway 504. The aircraft $A_1$ is positioned on the arrival segment 501. The aircraft is subjected to a sidewind Ve. The arrival segment 501 and the final segment 503 form an angle α. As in the previous example, a time constraint is entered on a waypoint downstream of the aircraft: here, the landing runway 504. It is also assumed that the estimated time of arrival at the constrained waypoint 504 is in advance with respect to the temporal constraint, making it necessary to lengthen the time, and therefore in the method according to the invention at unchanged speed to lengthen the trajectory.

The step of calculating a trajectory modification inducing a distance discrepancy ΔD differs from the previous step and employs the calculation mentioned in the second example above (see FIG. 3). The new extended trajectory comprising notably an extension 507 of length X (calculated as previously), a turn 505 of the same dimensions as the previous turn 502 and a capture 506 of this turn.

If there is an increase in the tailwind component (or a decrease in the headwind component), the length of the final segment t 503 is increased by a distance discrepancy ΔD/2.

If there is a decrease in the tailwind component (or an increase in the headwind component), the length of the final segment 503 is decreased by a distance discrepancy ΔD/2.

In the above two cases, the arrival segment of the new trajectory 505 is created so as to capture the new turn situated at the end of the lengthened final segment.

Figure 6:
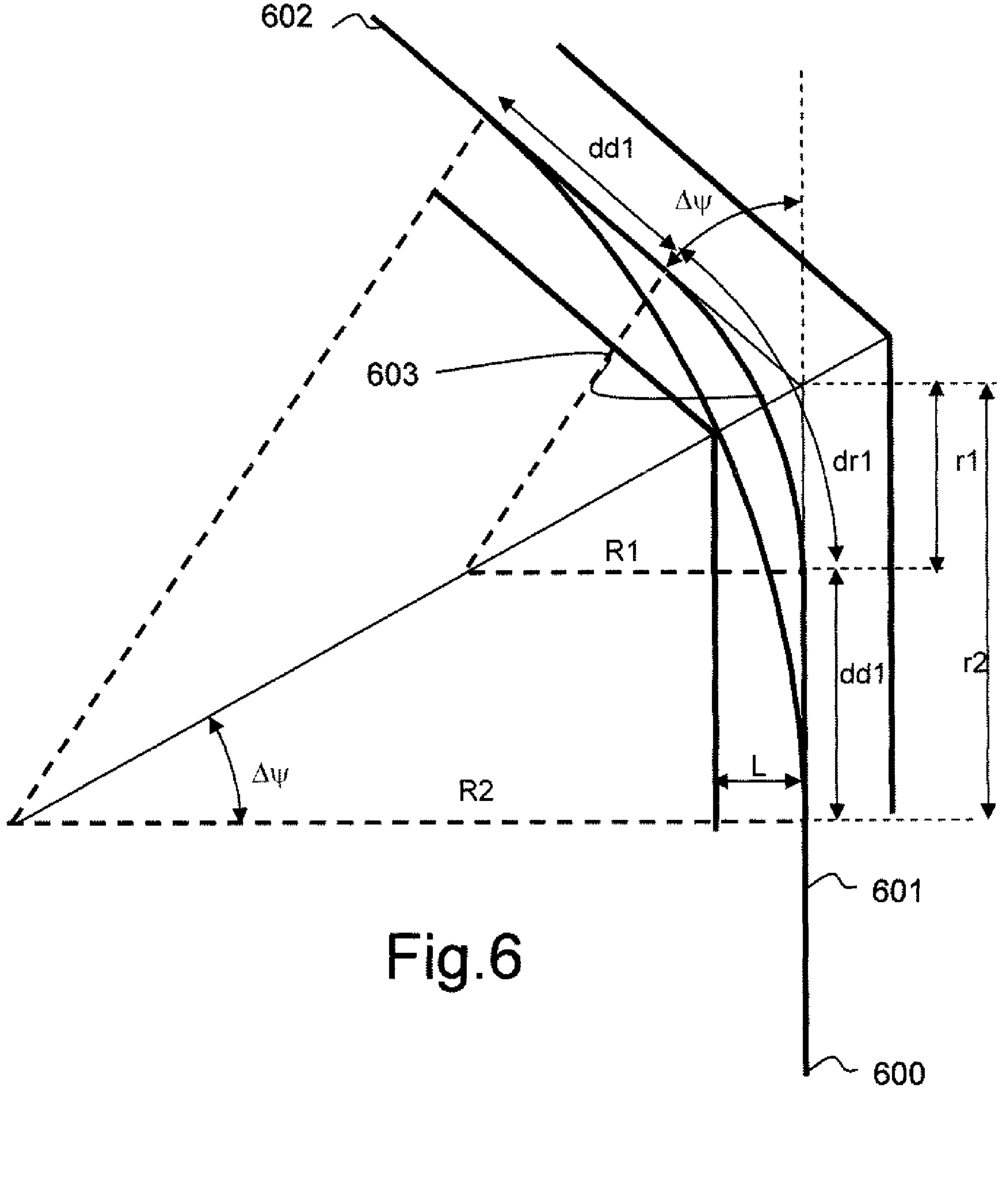
FIG. 6 illustrates a fifth exemplary implementation of the method according to the invention.

FIG. 6 illustrates a fifth exemplary implementation of the method according to the invention. An aircraft, not represented, is subject to an entry time constraint for a waypoint downstream of the aircraft. The aircraft follows a trajectory 600 comprising flight segments 601,602 and at least one transition 603 between these flight segments 601,602. The method consists in modifying at least one transition before the arrival of the aircraft at the constrained waypoint by using the lateral margins L of the route (including RNP) and the aircraft's banking angle (angle of roll) capabilities so as to reduce the length of the trajectory. The modification of the trajectory makes it possible to satisfy the temporal discrepancy related to a time constraint or else to a spacing constraint relative to a preceding aircraft without modifying the air speed.

Figure 7:
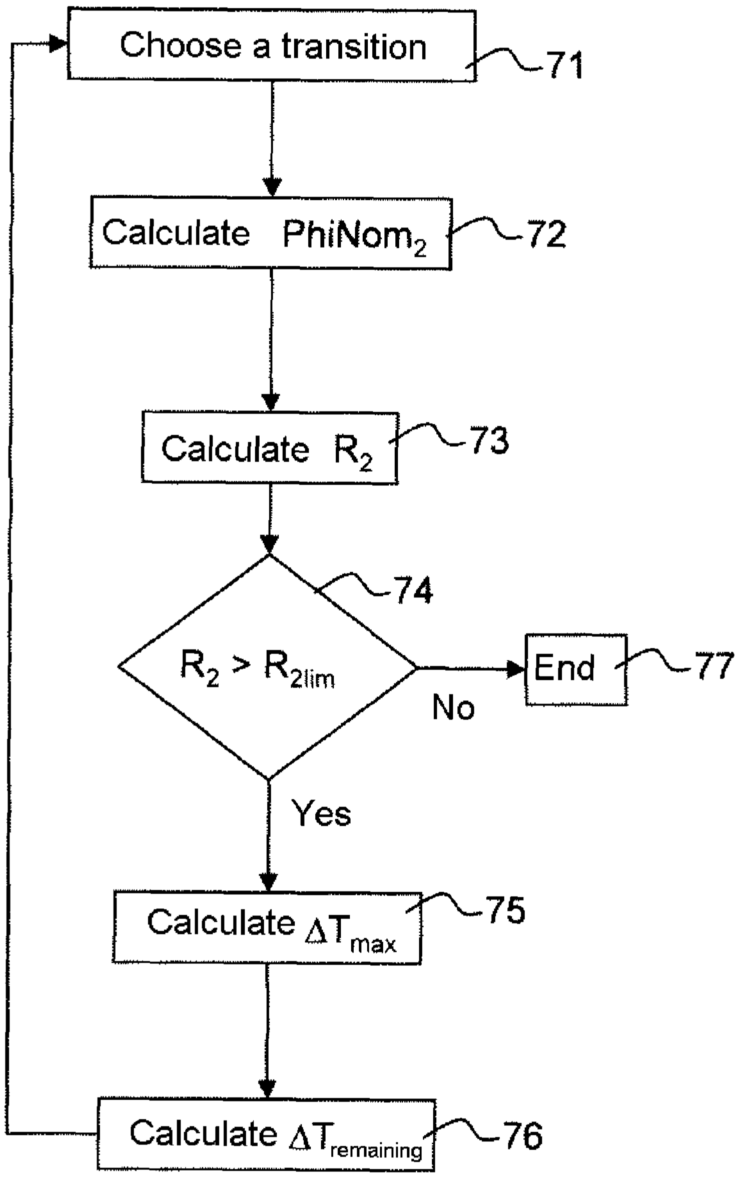
FIG. 7 represents a flowchart illustrating the main steps of a variant of the method according to the invention.

FIG. 7 represents a flowchart illustrating the main steps of a variant of the method according to the invention. In this variant, the step of modifying the trajectory comprises the following steps:

- the choice 71 of a transition of the trajectory 600, the chosen transition being upstream of the constrained point and downstream of the aircraft,
- the calculation 72 of a roll directive $PhiNom_2$ for the said transition on the basis of the temporal discrepancy ΔT, the said roll directive $PhiNom_2$ satisfying the following equation:

$$\text{PhiNom}_2=\text{Arctan}\{1/[1/\tan(\text{PhiNom})-g\cdot\Delta T/(Vg\cdot[\Delta\psi-2\tan\Delta\psi])]\}$$

With PhiNom a roll directive of the initial trajectory, g the terrestrial acceleration, V the speed of the aircraft, $\Delta\psi$ the angle between the two segments 601,602 linked by the transition 603;

the calculation 73 of the radius of curvature $R_2$ of the trajectory in the said transition on the basis of the roll directive $\text{PhiNom}_2$, the radius of curvature $R_2$ satisfying the following equation:

$$R_2=Vg^2/(g\cdot\tan(\text{PhiNom2}))$$

With g the terrestrial acceleration, V the speed of the aircraft;

if 74 the radius of curvature $R_2$ is less than the minimum radius $R_{2lim}$ making it possible to remain in the air route then 77 the roll directive $\text{PhiNom}_2$ is applied to the aircraft, $$R2\text{lim}=L/(1-\cos\Delta\psi)$$

With L the half-width of the air route and $\Delta\psi$ the angle between the two segments 601,602;

otherwise:

the calculation 75 of a maximum time discrepancy $\Delta T_{max}$ in the said transition and of a corresponding roll directive $$\Delta T_{max}=[D1-D2]/Vg$$

with D1 the length of the initial trajectory in the transition and D2 the length of the new trajectory in the transition $$D1=\Delta\psi\cdot R1+2\cdot\tan\Delta\psi\cdot[L/(1-\cos\Delta\psi)-Vg^2/(g\cdot\tan(\text{PhiNom}))]$$

with $\Delta\psi$ the angle between the two segments 601,602 linked by the transition 603, L the half-width of the air route, R1 the radius of curvature of the initial trajectory in the transition, V the speed of the aircraft, g the terrestrial acceleration, PhiNom a roll directive of the initial trajectory, $$D2=\Delta\psi\cdot L/(1-\cos\Delta\psi)$$

with $\Delta\psi$ the angle between the two segments 601,602 linked by the transition 603 and L the half-width of the air route, the calculation 76 of a remaining time discrepancy $\Delta T_{remaining}$: $\Delta T_{remaining}=\Delta T-\Delta T_{max}$ the iteration of the step 71 of choosing a transition with the remaining temporal discrepancy $\Delta T_{remaining}$, until there is no longer any transition, not yet selected.

According to a variant of the invention, the step 71 of choosing a transition of the trajectory selects the closest transition not yet selected upstream of the constrained point. The effect of this variant is to modify the transitions of the turns furthest from the aircraft first. This strategy has the advantage of not reacting too early when a discrepancy with a time constraint is noted, it being possible to lessen this discrepancy as the flight proceeds.

According to another variant of the invention, compliance with the time constraint is ensured by choosing one of the transitions situated the whole way along the trajectory between the aircraft and the constrained point and, on the other hand, transitions situated in the last turns before the constrained point. The effect of this is to regulate the discrepancy with the time constraint the whole way along the flight.

According to another variant of the invention, compliance with the time constraint is ensured by using on the one hand a scheme for regulating the speed according to the known art and on the other hand the method according to the invention.

Figure 8:
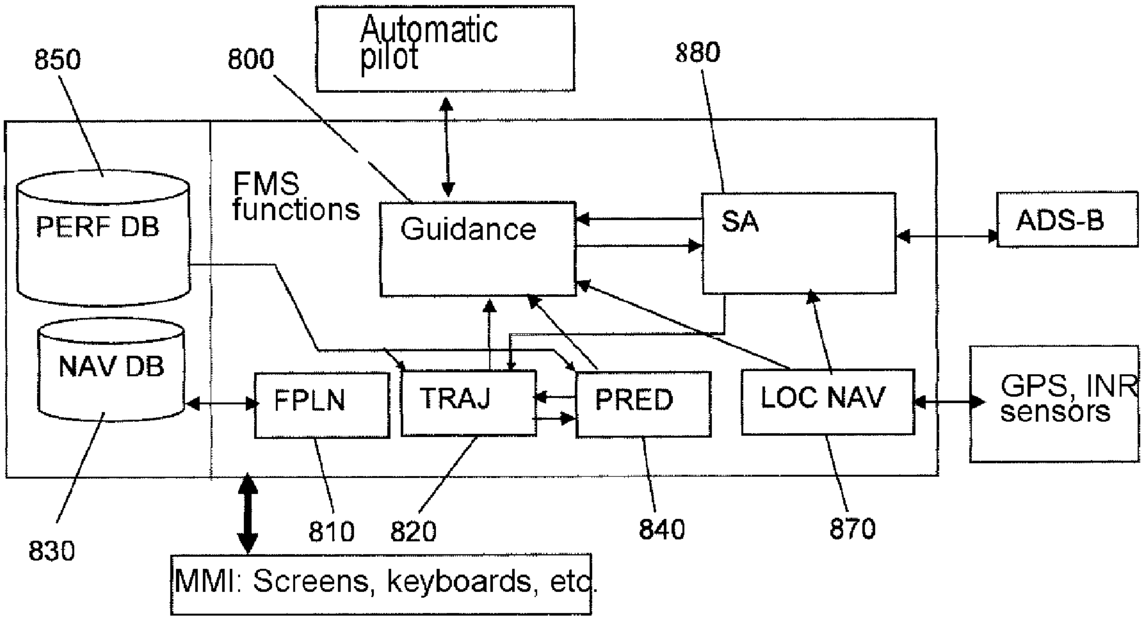
FIG. 8 illustrates an architecture of a flight management system.

FIG. 8 illustrates an architecture of a flight management system. The onboard flight management system (FMS) is the computer which determines the geometry of the 4D profile (3D+time-profile of speeds), and dispatches the guidance directives for following this profile to the pilot or to the automatic pilot. A flight management system employs the following functions described in ARINC standard 702 (Advanced Flight Management Computer System, December 1996). Such a flight management system comprises modules for:

Navigation LOCNAV, 870, for performing optimal location of the aircraft as a function of the geolocation means (GPS, GALILEO, VHF radio beacons, inertial platforms);

Flight plan FPLN, 810, for inputting the geographical elements constituting the skeleton of the route to be followed (departure and arrival procedures, waypoints, airways);

Navigation database NAVDB 830, for constructing geographical routes and procedures with the help of data included in the bases (points, beacons, interception or altitude legs, etc.);

Performance database, PERF DB 850, containing the craft's aerodynamic and engine parameters.

Lateral Trajectory TRAJ, 820: for constructing a continuous trajectory on the basis of the points of the flight plan, complying with the aircraft performance and with the confinement constraints;

Predictions PRED, 840: for constructing a vertical profile optimized on the lateral trajectory;

Guidance, GUID 800, for guiding in the lateral and vertical planes the aircraft on its 3D trajectory, while optimizing the speed;

Situation perception or SA for Situation Awareness, 880 notably for communicating with the control centres and other aircraft.

The method according to the invention is distributed around the Situation Awareness 880, Guidance 800 and Trajectory 820 functions. It uses as input the prediction elements 840 constructed on the basis of the flight plan 810, performance database 850 and navigation database 830, as well as the aircraft position and its state vector originating from the Location module 870.

The method according to the invention makes it possible to reconstruct and adapt a trajectory around the turn which makes it possible to lessen and maintain an appropriate time discrepancy with respect to a preceding aircraft (maintaining separation) or with respect to a transit time constraint to pass a downstream point (maintaining timetable), by taking account of the information, received by ADS-B "broadcast" data communication, regarding the position and speed of the preceding aircraft.

In the case of maintaining separation, the principle consists in acquiring the position of the preceding aircraft by ADS-B, comparing it in real time through a Situation Awareness module 880 with the current position of the aircraft 870 and if the distance is insufficient for the safety separation, the trajectory is recalculated 820 by lengthening (if the two aircraft are getting closer) or shortening (if the two aircraft are moving further apart) for example the current section (general case) so as to keep the separation constant. The trajectory modification, previously accepted by the pilot, is dispatched to the guidance 800 which will be slaved thereto. The flight plan is not modified for all that and the guidance is done automatically by the FMS ("managed" mode).

The inherent speed of the aircraft situated downstream will be obtained by ADS-B reception of the speed of the aircraft (aircraft data frame of the ADS-B message).

The constant-wind measurement may emanate from the ATIS wind information provided by the airport or, if the former exists, from the downstream aircraft received by ADS-B means, mixed with the real wind measured upstream.

The calculation of the new trajectory consists in making a manoeuvre of DIR TO inbound type (direct linkup with pre-alignment of route on the leg following the TO point) on the point occupied by the aircraft downstream, taking account of a separation route of the aircraft upstream.

The solution to the problem will be achieved as a function of the angle of the trailing aircraft, of its distance with respect to the downstream aircraft, of the inherent speed of the two aircraft. If moreover the downstream aircraft provides speed information by ADS-B, then the difference in speed between the two aircraft will be taken into account.

The invention claimed is:

1. A method for managing the flight of a first aircraft (A1) using a flight management system flying along a trajectory and being subject to a temporal constraint defined by a date determined with respect to a fixed point be by a temporal separation with respect to a second aeroplane (A2), the first aircraft (A1) flying according to a constant air speed ($V_{a1}$), with an initial wind (Ve), the method comprising the following steps:

calculation of a distance (ΔD) on the basis of the initial wind (Ve) and of the air speed ($V_{a1}$) using the flight management system; and modification of the trajectory using the flight management system: if the distance (ΔD) is positive, lengthening the trajectory by a distance equal to the distance (ΔD); if the distance (ΔD)is negative, shortening the trajectory by a distance equal to the opposite of the distance (ΔD), the trajectory being situated in an air route and comprising flight segments and at least one transition between the flight segments, the modification of the trajectory making it possible to satisfy the temporal constraint without modifying the air speed of the first aircraft (A1), the modification of the trajectory comprising the following steps:

choosing of a transition of the trajectory, calculation of a roll directive ($PhiNom_2$) for the transition on a basis of the a temporal discrepancy (ΔT), calculation of a radius of curvature ($R_2$) of the trajectory in the transition on the basis of the roll directive ($PhiNom_2$), if the radius of curvature ($R_2$) is less than a minimum radius ($R_{2lim}$) making it possible to remain in the air route, the roll directive ($PhiNom_2$) is applied to the aircraft, otherwise:

calculation of a maximum time discrepancy ($\Delta T_{max}$) in the transition and of a corresponding roll directive, calculation of a remaining time discrepancy ($\Delta T_{remaining}$): $\Delta T_{remaining} = \Delta T - \Delta T_{max}$, and iteration of the step of choosing a transition with a remaining temporal discrepancy ($\Delta T_{remaining}$) until there is no longer any transition, not yet selected.

2. The method according to claim 1, wherein, said temporal constraint is expressed in the form of a temporal minimum separation with the second aircraft (A2) flying along the trajectory followed by the first aircraft and situated downstream of the first aircraft (A1), the trajectory comprising a turn, the second aircraft (A2) being subject to the initial wind (Ve), the method furthermore comprises the following steps:

acquisition of the air speed ($V_{a2}$) of the second aircraft (A2);

calculation of the ground speed ($V_{s1}$) of the first aircraft (A1) on the basis of its air speed ($V_{a1}$) and of the initial wind (Ve) and the calculation of the ground speed ($V_{s2}$) of the second aircraft (A2) on the basis of its air speed ($V_{a2}$) and of the initial wind (Ve); and wherein the distance (ΔD) is equal to the integration, over the time during which the two aircraft (A1) traverse the turn, of the difference between the ground speed ($V_{s1}$) of the first aircraft (A1) and the speed over the ground ($V_{s2}$) of the second aircraft (A2).

3. The method according to claim 2, the trajectory further comprising an arrival segment and a final segment that are parallel, and wherein the modification of the trajectory is by half the distance ($D_{sep}$) calculated on the arrival segment and by half the distance ($D_{sep}$) calculated on the final segment.

4. The method according to claim 2, the trajectory further comprising an arrival segment and a final segment forming an angle α, and wherein the modified trajectory comprises a lengthening segment-situated straight ahead of the final segment, a modified turn linked to the lengthening segment and capture segment linking the trajectory of the aircraft to the modified turn.

5. The method according to claim 1, the trajectory further comprising a turn, the temporal constraint being expressed in the form of a determined date at the fixed point, the first aircraft (A1) comprising a flight management system calculating a remaining flight time ($T_{remaining}$) so that the aircraft arrives at the given point by flying at the air speed ($V_{a1}$) and with the initial wind (Ve), and the method furthermore comprises a step of measuring a wind discrepancy (ΔVe) with the initial wind (Ve), and in that the calculation of the distance (ΔD) follows the following relation:

$$\Delta D = \Delta Ve \cdot,$$

K being a factor related to the turn time.

6. The method according to claim 5, wherein the modification of the trajectory is by half the distance (ΔD) calculated on the arrival segment and by half the distance (ΔD) calculated on the final segment.

7. The method according to claim 5, wherein the trajectory comprises a final segment and an arrival segment forming an angle α, the modification of the trajectory consisting of an extension of length equal to half the distance (ΔD), of a new turn and of a capture of the new turn.

8. A method according to claim 1, wherein the step of choosing a transition of the trajectory selects the closest transition not yet selected upstream of the constrained point.

* * * * *